Fig. 4.

United States Patent Office 3,345,865
Patented Oct. 10, 1967

3,345,865
VEHICLE TESTING DEVICE
Robert F. Ostrander, New Haven, Conn., assignor to Ostradyne, Inc., New Haven, Conn., a corporation of Connecticut
Filed Aug. 11, 1966, Ser. No. 584,287
15 Claims. (Cl. 73—117)

ABSTRACT OF THE DISCLOSURE

This invention is directed to dynamometers to measure vehicle wheel horsepower. More particularly, this invention relates to an improved dynamometer testing system for determining the power output of vehicles having ground engaging drive members, comprising first and second rolls, means for rotatably supporting said first roll, means for rotatably supporting said second roll at an elevation above said first roll position, said first and second rolls positioned to engage one of the drive members in torque-transmitting relationship and be driven thereby, and torque-absorbing means coupled to each of the rolls.

---

This invention relates in general to dynamometers of the type known as chassis dynamometers for testing the power output, braking effectiveness, and other factors of the performance of vehicles, and pertains more particularly to dynamometers for testing large wheel or track driven vehicles such as tractors, military tanks and earth moving machinery. The present application is a continuation-in-part of my previous application Ser. No. 316,270, filed Oct. 15, 1963 and now abandoned.

A common type of chassis dynamometer utilizes pairs of rolls for supporting a pair of drive wheels of a vehicle. One roll of each pair, usually the forward roll, is connected to a power absorption device which measures the power output when the vehicle wheels are driven by the engine, and these rolls may also be driven by a suitable motor and the power input measured to determine the effectiveness of the vehicle's braking system, power losses in the transmission, and similar factors. The other roll in each pair is idle and serves chiefly to cradle and support the drive wheels of the vehicle. The driving force to be measured, when the vehicle wheels are being driven, is transmitted by frictional engagement between the tires and the driven rolls.

In order to measure power output or input accurately it is necessary to prevent slippage between the vehicle tires and the power measuring rolls. A common practice is to load the vehicle with enough weight to maintain traction, if the weight of the vehicle itself is not sufficient. When the vehicle wheels are being driven by the engine, the wheels tend to climb forward. The reverse occurs, when the driven rolls are used for power input, for example, in testing the braking system. In both cases, the weight of the vehicle tends to be carried by a single roll of each pair, which results in a concentration of weight on the relatively small area of contact between each tire and a single roll. The high localized stress and the kneading action which occurs as the area of contact progresses around the turning tire causes considerable wear on the tires and produces heat which weakens the tire structure. Unequal distribution of the weight between the two rolls also produces slippage because the effective radius of the tire is less at the more heavily loaded point. This slippage adds to the tire wear and also creates heat.

In testing automobiles and other light vehicles, tire wear is not a serious problem because the amount of wear which occurs during the relatively short time required for a routine test does not materially affect the life of the tires. If extensive tests, such as might be run on an experimental vehicle, ultimately destroy the tires, the cost of replacement is relatively small.

In testing large vehicles, the loading required to maintain traction, at the high power outputs of which the vehicle is capable of developing, imposes excessive stresses on the tires. The combination of localized dead load and the kneading action, resulting in overheating of the tires, will destroy a tire very rapidly. The tires for those vehicles, such as large earth moving equipment, for example, may cost several thousand dollars apiece. The same consideration applies to testing of heavy tracked vehicles such as large tractors and military tanks. The high localized stress and continuous progress of the stressed and flexed area as the track moves over the test rollers, results in rapid destruction of the tracks and the drive wheels in the stressed region. These parts are also very expensive to replace.

Because of the difficulties just discussed, it is not practicable to test the performance of large vehicles directly, in fully assembled condition, by present types of chassis dynamometers. It is necessary to rely on estimates of the vehicle's performance derived from tests made on separate components, for example, measurements of engine power output and transmission and wheel friction losses. Such estimates do not give an accurate measure of the vehicle's performance under actual road conditions, and it is very time consuming to dismantle and test the components of a vehicle which is in use.

The principal object of this invention is to provide a chassis dynamometer which is capable of testing heavy vehicles with high power output, without imposing excessive strain on the tires or tracks of the vehicles. Another object is to provide a dynamometer which will yield quick and accurate indications of the effect of various adjustments which may be made on the engine or other components of the vehicle. Another object is to provide a means of testing an assembled vehicle without disconnecting any of its drive parts. Still another object is to provide a chassis dynamometer which minimizes the tendency of the vehicle to climb out of the test equipment, an action which must usually be prevented by the use of heavy restraining cables or chains. Other objects, advantages and novel features of the invention will be apparent from the following description.

The dynamometer here described employs two sets of two or more supporting rolls, one set for each drive wheel or track of the vehicle to be tested. All the rolls in each set engaging the drive wheel or track are connected together by suitable drive mechanism so as to be driven in unison. The rolls may be driven by the wheels or track of the vehicle and each set is connected to a power absorption dynamometer which measures the power output of the vehicle. The sets of rolls are also connected to electric motors, or other external drive means, which are used to test braking efficiency and power losses in various drive components of the vehicle.

One version of the dynamometer, used for wheeled vehicles has two rolls in each set. The rolls are mounted on a swinging frame, the angle of which is adjusted by manual or automatic means, to maintain substantially equal load distribution between the two rolls when the vehicle tends to climb toward one or the other. In another form, intended for tracked vehicles, three or more rolls may be used in each set, and the front rolls are mounted on swinging frames so as to engage the obliquely disposed forward portions of the tracks and restrain forward motion of the vehicle.

In the drawings illustrating the invention.

DYNAMOMETER FOR TWO-WHEEL DRIVE VEHICLES

Figure 1:
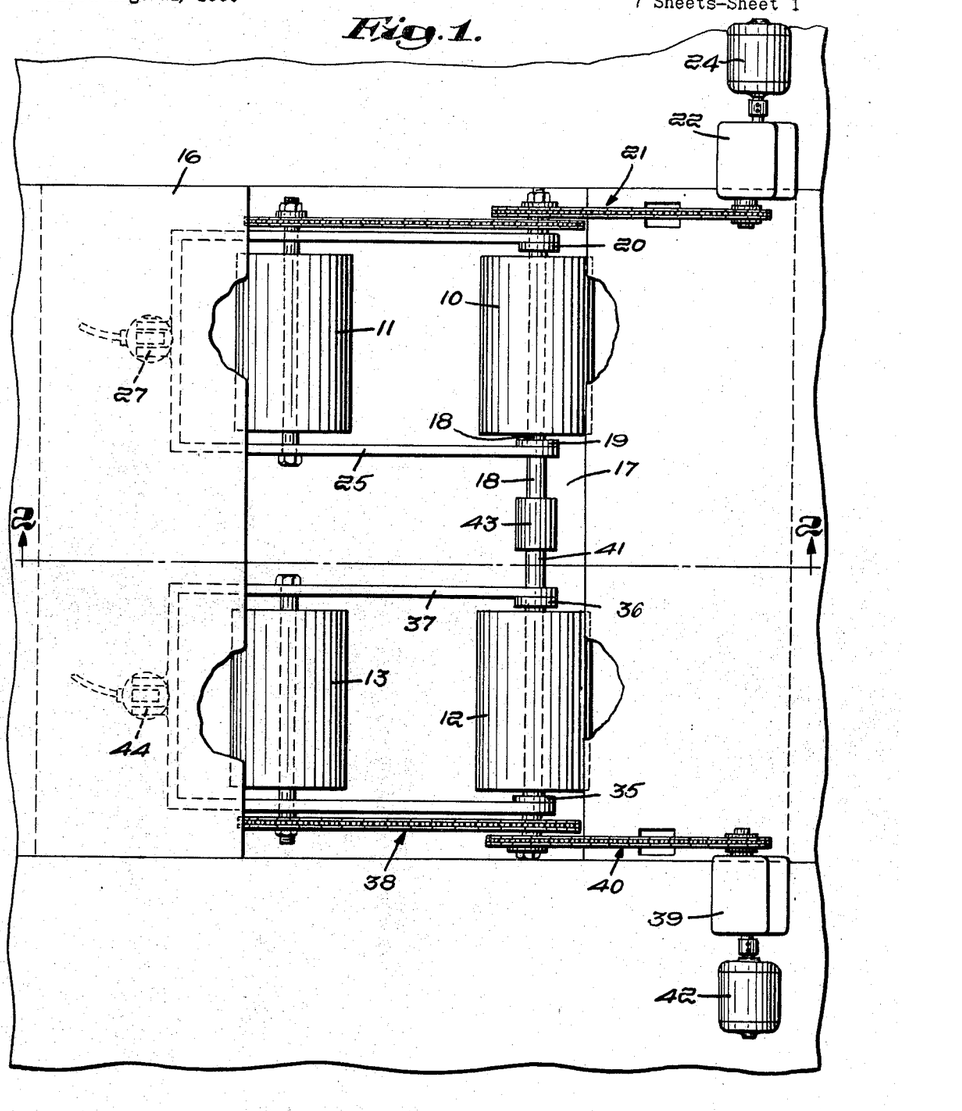
FIG. 1 is a plan view of a chassis dynamometer constructed according to the invention.
Figure 2:
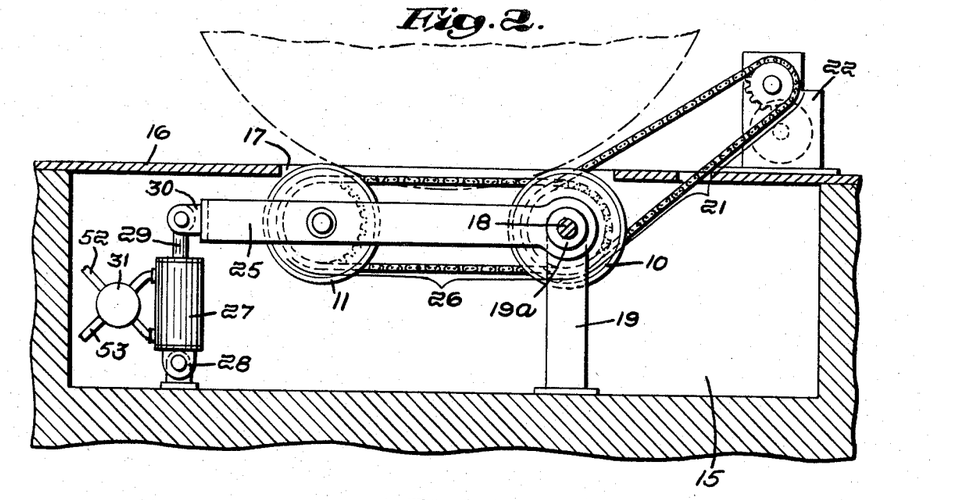
FIG. 2 is a cross-section taken along line 2—2 of FIG. 1.

The dynamometer illustrated in FIGS. 1 and 2 is intended for testing vehicles with two drive wheels. A pair of rolls 10 and 11 are disposed with their axes parallel, one in front of the other, to receive the left hand drive wheel and a similarly disposed pair of rolls 12 and 13 receive the right hand wheel. The rolls are here shown as mounted in a pit 15 at the level of a floor 16 which has an opening 17. It is understood, however, that the apparatus may be mounted above the floor and suitable ramps and supports provided for driving the vehicle onto the rolls and supporting the front end.

Roll 10 is mounted on a shaft 18 which extends through fixed bearing posts 19 and 20. The shaft is connected by a chain and sprocket drive 21 to a dynamometer 22 of suitable type, such as the water absorption type, and capacity for the expected torque loads. The shaft may also be connected through the dynamometer gearing to an electric motor 24 for driving the rolls. The motor may be a synchronous motor generator employed to measure either power input or power output, alone or in combination with an absorption dynamometer used to absorb the average load while the motor generator indicates variations, as described in my copending application Ser. No. 311,144 filed Sept. 24, 1963. When the motor generator is used alone, the dynamometer runs idle.

Bearing post 19 has a projecting boss 19a concentric with shaft 18, and post 20 carries a similar boss 20a (not shown). A rigid U-shaped frame 25 is rotatably mounted on these bosses. Roll 11 is journaled on the frame. Rolls 10 and 11 are connected together by a one-to-one ratio chain and sprocket drive 26, so as to be driven in unison. A hydraulic cylinder 27 is mounted on a swivel mounting 28 on the base of the pit and the piston rod 29 of the cylinder is connected by a swivel coupling 30 to the frame 25. By advancing and retracting the piston, roll 11 can be raised and lowered with respect to roll 10. The cylinder is driven by a hydraulic system including a valve 31, which may be controlled, as will be later explained, by any well-known means to move the piston and adjust the angle of frame 25 for the purpose of equalizing the load distribution on the two rolls.

The rolls 12 and 13 are mounted in the same manner as rolls 10 and 11. Roll 12 is mounted on fixed bearing posts 35 and 36 and roll 13 is mounted on a frame 37 swingable on the posts about the axis of roll 12. These rolls are connected together by a chain and sprocket drive 38 and to a second dynamometer 39 by a chain and sprocket drive 40, and a second motor generator 42 is connected to this dynamometer. Shaft 41 of roll 12 is also connected to shaft 18 through a clutch 43. The angular position of frame 37 is controlled by a piston 44.

To use this chassis dynamometer, the vehicle to be tested is driven onto the test apparatus so that the drive wheels are cradled on the pairs of rolls 10, 11 and 12 and 13. If engine output is to be tested, the engine is brought up to the desired test speed and braking torque is applied by the dynamometers to hold the wheels at that speed. The total power output may be measured by the two dynamometers 22 and 39, used alone or in combination with their associated motor generators. When the latter are used in the manner described in my aforesaid copending application, the average or major part of the power output is absorbed by the dynamometers and any differential appears as current input or output in the motor generators and is measured by appropriately connected wattmeters.

The clutch 43 may be disconnected and the power output of each wheel measured separately. During the testing operation the angle of frames 25 and 37 may be adjusted by means of cylinders 27 and 44 to maintain equal, or approximately equal, load distribution between the wheels and the two rolls of each pair, using one of the control systems to be later described.

For making braking, power loss, and similar tests the motors 22 and 44 are used to drive the pairs of rolls and the torque is measured by their power consumption. The angle of the frames may be adjusted for these procedures also, although this is usually not necessary because the torques involved are low enough so that tire loading is not a serious problem.

Theory of operation

As is well known, power is a linear function of torque times speed. In a chassis dynamometer, used to measure a vehicle's power output, a braking torque is applied to the measuring roll of such magnitude as to balance the torque delivered to the roll by the wheel at a selected constant speed. Horsepower is calculated by measuring the braking torque by suitable means such as an absorption type of dynamometer, and multiplying this measurement by the r.p.m. of the roll and a suitable constant which is a function of known physical characteristics and dimensions of the particular dynamometer. Horsepower may also be read directly on suitably calibrated meters.

Figure 3:
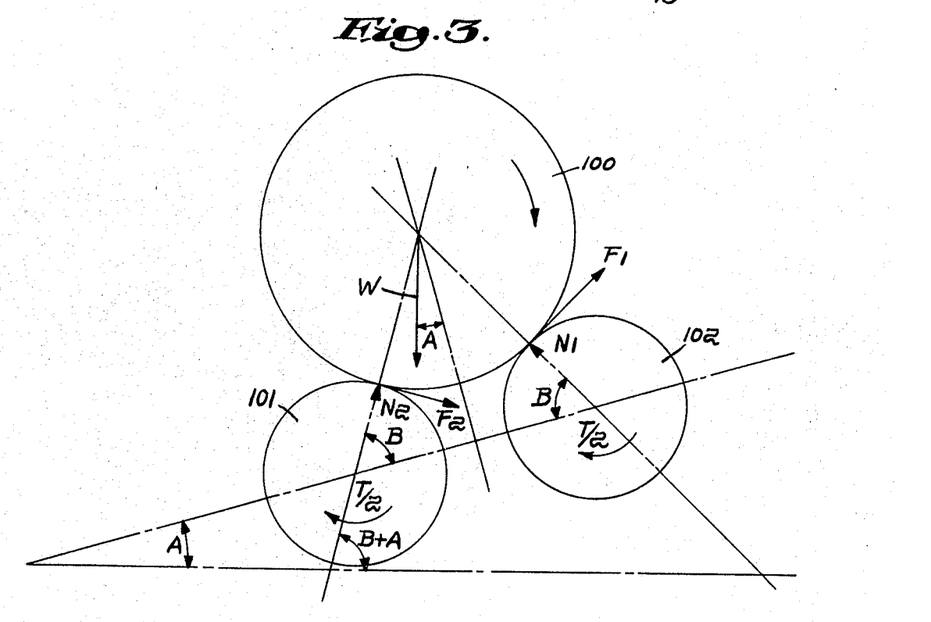
FIG. 3 is a schematic diagram illustrating the forces between a vehicle wheel and a pair of rolls.

Referring to FIG. 3, a wheel 100 is shown mounted on a pair of rolls 101 and 102, the centers of which lie on a line at an angle A with respect to the horizontal. The wheel is being driven clockwise and the rolls braked by a total torque T divided equally between them. For the desired condition of equal load distribution, the normal loads $N_1$ and $N_2$ between the rolls and the tire are equal. The braking torques give rise to tangential forces $F_1$ and $F_2$ which are equal if the rolls are of equal radius. For a condition of equilibrium, the sum of the horizontal forces and the sum of the vertical forces, including the downward load W on the tire, are both zero. The angle A to satisfy the above condition can be calculated as follows:

HORIZONTAL FORCES
$$N_2 \cos(B+A) + F_2 \sin(B+A)$$
$$-N_1 \cos(B-A) + F_1 \sin(B-A) = 0$$

VERTICAL FORCES
$$N_2 \sin(B+A) - F_2 \cos(B+A)$$
$$+ N_1 \sin(B-A) + F_1 \cos(B-A) - W = 0$$

Also, in the direction normal to the centerline of the rolls, the components are equal and opposite so that $$N_1 \sin B + N_2 \sin B = W \cos A$$

Therefore:

$$N_1 = N_2 = \frac{W \cos A}{2 \sin B}$$

The angle B can be readily figured from the roll radius and spacing and the wheel radius Also $$F_1 = F_1 = \frac{T}{2R}$$

where T is the measured braking torque, and R the roll radius. A solution of the above equations gives the following relationship between the braking torque and the angle A $$T = \frac{RW \sin A}{\sin B}$$

The downward load W on the wheel is made up of two forces, the dead load on the wheel when the vehicle is at rest, and a downward component resulting from application of braking torque which tends to rotate the vehicle as a whole. W can be calculated by the equation $$W = W_o + \frac{TR_w}{RD}$$

where $W_o$ is the dead load on the wheel, $R_w$ is the tire radius and D is the wheel base of the vehicle. By substituting in the solution of the previous equations $$T = RW_o \times \frac{D \sin A}{D \sin B - R_w \sin A}$$

Figure 4:
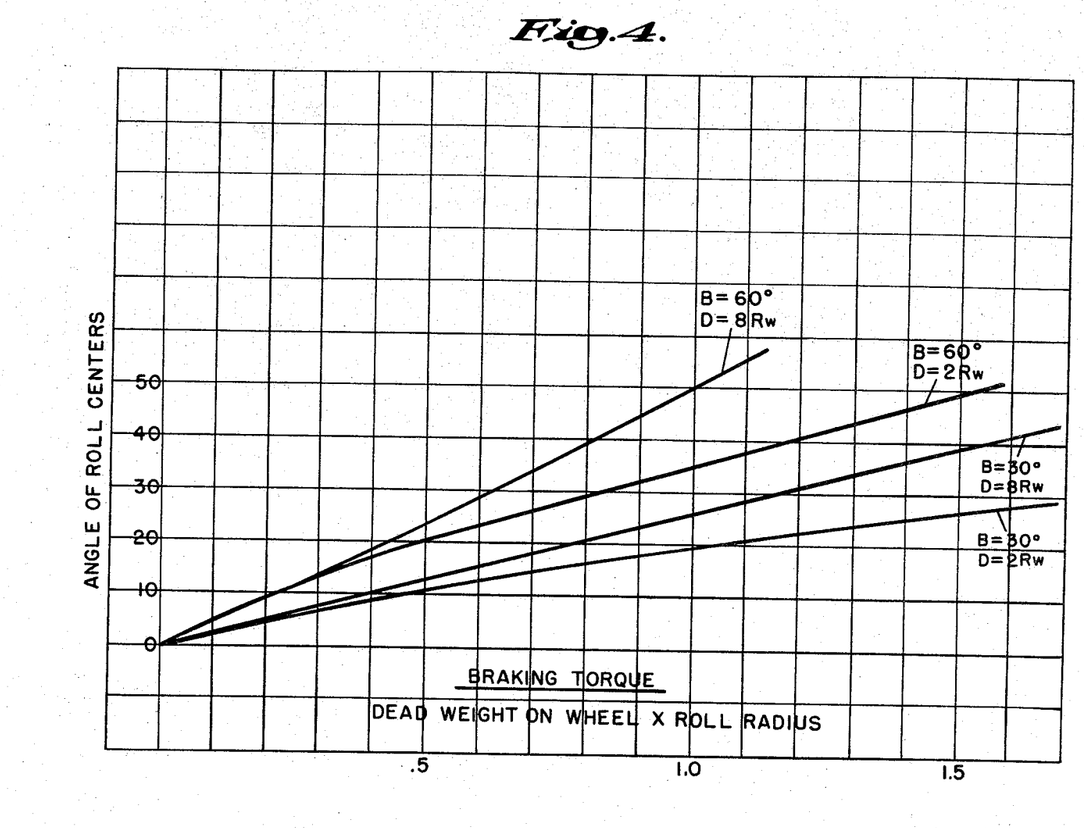
FIG. 4 is a graph illustrating the relationship between torque applied to a wheel and the angle of the swinging frame, for representative wheel bases and tire sizes.

FIG. 4 illustrates the relationship of the angle A to braking torque (plotted for convenience as $T/RW_o$) for two typical relationships of tire size, roll size and roll spacing, in which the angle B is 30° and 60°, respectively, and two wheel base lengths, one of twice the tire radius which is the minimum possible in a vehicle with wheels of equal size, and another of eight times the tire radius which is in the range common for cars and trucks.

Similar curves can be plotted for any particular vehicle and dynamometer.

The curves of FIG. 4 illustrate that the relationship of the angle A to braking torque is substantially linear up to about 50° and becomes more linear as the length of the wheel base increases. From consideration of the normal horsepower to weight ratios useable for wheeled vehicles, the limitations imposed by tire slippage, and the practical minimum size for the supporting rolls, it is apparent that $T/RW_o$ would approach or exceed a value of one only in rare cases. Therefore, the angle A ordinarily remains relatively low.

The principles just discussed apply also when the rolls are being driven by an external motor against a braking torque, for example, when testing the braking system of the vehicle or measuring power losses in the transmission. In this case, the direction of the forces $F_1$, $F_2$ is reversed, and the angle A for a condition of equilibrium and equal load distribution is a negative angle. The same would be true if the vehicle wheel is being driven in reverse by the vehicle engine against a braking torque imposed on the wheel, although this manner of testing is seldom used.

*Controls for frame angle*

The foregoing explanation shows how the angle of the frames 25 and 37 which will produce exactly equal load distribution between the rolls of each pair can be determined for any given set of conditions. In practice it is ordinarily not necessary to maintain the equal load relationship exactly, for several reasons. Imbalance in the load distribution does not affect the accuracy of the power measurement because the total power output of each pair of rolls is measured. Also, both rolls are positively driven in unison so that no speed differential, resulting in slippage of the tire on one or the other roll, can occur. Furthermore, a certain amount of load imbalance does not critically affect tire stress or the torque at which the tire will begin to slip. In a vehicle weighing several tons, for example, a few hundred pounds load differential between the two rolls of a pair can be tolerated. It is necessary only to maintain the load distribution approximately equal, that is near enough equal so that the advantages of having two regions of driving engagement with the tire, through both of which a substantial amount of torque can be transmitted, are realized.

For installations designed to test vehicles of the same general type, that is of approximately the same size and power, at a constant test speed or a narrow range of test speeds, controls for the angular position of the rolls may be dispensed with, and the frames 25 and 37 may be mounted in a fixed position in any suitable way, such as providing additional fixed bearing posts, at an angle which would result in equal load distribution under average conditions.

Figure 7:
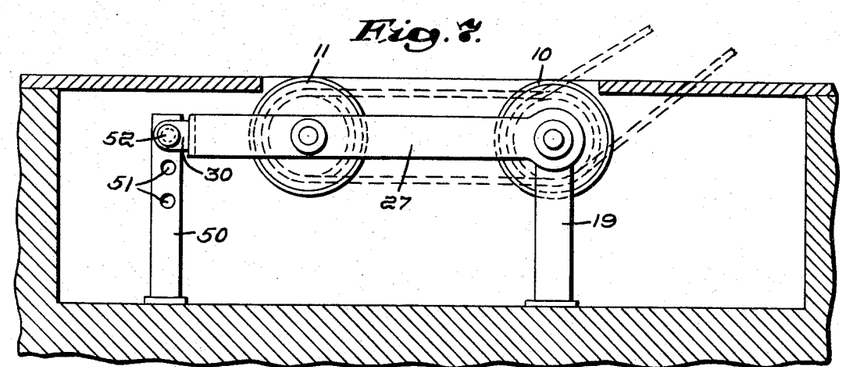
FIG. 7 is a cross-section, similar to FIG. 2, illustrating one method of adjusting frame angle.

FIG. 7 illustrates another simple modification which would be adequate for a wider range of vehicle sizes, torques, and test speeds. The cylinder 27 is replaced by a fixed post 50 passing through coupling 30, and having a number of holes 51. The frame may be jacked to a position in which coupling 30 is aligned with one of the holes and a pin 52 inserted to lock the frame in place. This arrangement permits the frame to be set at several different angles corresponding to average angles for several ranges of conditions. The position of frame 37 may be similarly adjusted.

Another simple means of adjusting the angle of the frames is by manual control of cylinders 27 and 44. In FIG. 1, for example, the input of fluid to cylinder 27 is controlled by a three position four way valve 31 which may be a manually operated valve. The valve is connected to a pressure line 52 leading to any convenient source (not shown) of fluid under pressure, and an exhaust line 53. By turning the valve the cylinder can be operated to raise and lower frame 25. This type of adjustment may be made to any desired degree of accuracy by reference to curves such as those shown in FIG. 4 plotted for the particular test conditions. It is understood that some means of indicating the frame angle, such as an angular scale on the bearing posts, may be provided.

Figure 8:
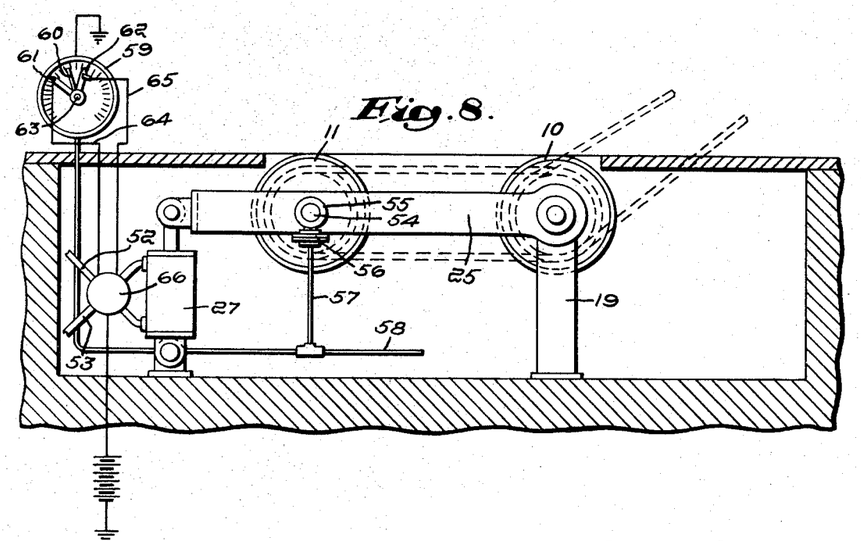
FIG. 8 is a cross-section, partly broken away, similar to FIG. 2 with another form of control for the frame angle schematically illustrated.

FIG. 8 illustrates an automatic control system for maintaining the load distribution on the rolls approximately equal. Roll 10 is mounted as previously explained. Roll 11 is journaled in a bearing 54 which is retained in a slightly elongated hole 55 in frame 25 so that limited vertical movement of roll 11 with respect to the frame is possible. A pneumatic load cell 56 of a type frequently used in dynamometer work and known under the trademark "Hagan Thrustorq" is mounted under bearing 54. This type of cell consists essentially of a closed, shallow cylinder having a flexible diaphragm in the top and a tube 57 which admits compressed air derived through tube 58 from any convenient source. A load on the diaphragm produces a proportionate increase in air pressure. The air line is connected to a calibrated pressure gauge 59. In this case a type of gauge is used which has an indicator needle 60 and a pair of contact arms 61 and 62 carried by an adjustable knob 63. With the vehicle on the test stand, the dead load on cell 56 is registered by needle 60. Arms 61 and 62 are adjusted to such a position that the needle lies between them. These arms are electrically connected by wires 64 and 65 to a four way solenoid valve 66 of the type which opens in one direction when one circuit is energized and the opposite direction when the other circuit is energized. This valve is connected in the hydraulic control system for cylinder 27 in the same way as valve 31. A change in the load on roll 11 causes needle 60 to engage one or the other of the contact arms and energize the solenoid valve to raise or lower the frame 25 by means of cylinder 27 until the load is restored to the initial value.

The control system just described maintains the load on the roll 11 at the initial set value, usually the dead load. This system does not take into account the increase in load on the drive wheels due to application of braking torque when the engine is running. As previously explained, this increment is equal to torque times wheel radius divided by roll radius times wheel base. For most vehicle configurations and torque outputs this increment is relatively small with respect to the initial load on the rolls, which is the dead weight of the vehicle carried by the drive wheels, so that the load distribution between the rolls is kept near enough equal to achieve the desired results.

Figure 9:
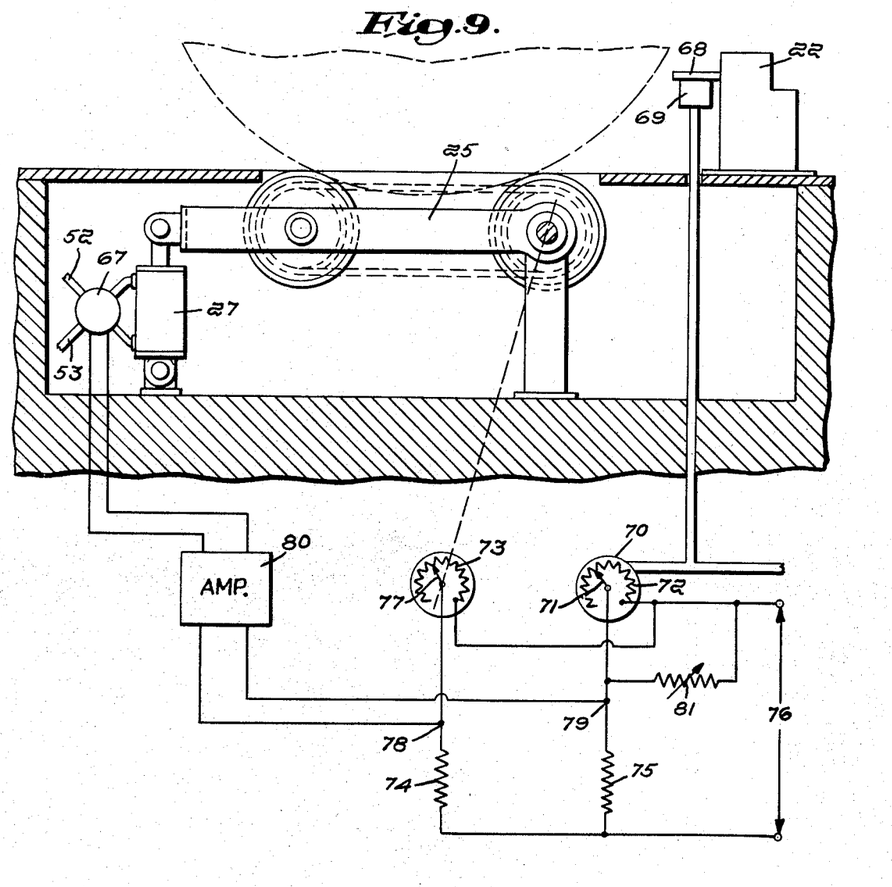
FIG. 9 is a schematic illustration of still another form of control system for the frame angle.

A system for controlling the angle of frame 25 in accordance with the braking torque registered by the dynamometer 22 is illustrated in FIG. 9. This is an electric servo system designed to operate a solenoid valve 67, similar to valve 66, to raise and lower frame 25 by means of cylinder 27. One of the customary ways of measuring torque developed by a dynamometer is by means of a torque arm bearing on a compressed air load cell of the type previously described, the pressure being proportionate to the torque. Here an arm 68 bears on a cell 69, and the air pressure in the cell is lead to a Bourdon type of pressure gage 70 modified so as to drive a rotary tap 71 of a variable resistor 72 to provide a resistance which varies in proportion to the torque. This variable resistance is connected in a bridge circuit including a second variable resistance 73, and equal resistors 74 and 75. Power is supplied to the bridge from any convenient power source 76. Rotary tap 77 of resistance 73 is mechanically coupled to arm 25 so as to rotate with the arm.

The output current from output junctions 78 and 79 of the bridge may be amplified, if necessary, by means of an amplifier 80, and used to operate valve 67. Resistor 72 is set to zero when the torque is zero, and resistor 73 is zero when the angle of frame 25 is zero. When torque is developed by the dynamometer, a proportionate resistance is introduced by resistor 72 unbalancing the bridge. Valve 67 opens and causes the angle of arm 25, and consequently the setting of tap 77, to change until the bridge is again balanced. Any change in torque results in an imbalance in the bridge in one direction or the other and valve 67 is operated in the appropriate direction to change the angle of arm 25 until the bridge is again balanced.

Response of the servo system may be adjusted by any suitable means such as a variable resistance 81 connected in parallel with resistance 72. The correct response, that is the angle through which tap 77, and arm 25, must be moved to balance the bridge for a given movement of tap 71, may be determined for any given set of conditions by calculation of torque/angle curves such as those shown in FIG. 4, and the setting of resistance 81 may be suitably calibrated.

It is understood that in all cases a duplicate system for controlling the angular position of frame 37 may be provided, or, alternatively, both frames may be controlled by a single system so as to move together.

*Operation of dynamometer for wheeled vehicles*

With the frames 25 and 37 in level position, the vehicle is driven onto the test apparatus so that the drive wheels are cradled in the pairs of rolls 10, 11 and 12, 13. The engine of the vehicle is brought up to the speed or series of speeds desired for test, and braking torque applied by the dynamometers. During the tests the angle of the frames may be set by any of the control methods previously described.

The total power output can be measured by engaging clutch 43 and using either or both dynamometers. With clutch 43 disengaged, the output of each wheel can be measured individually.

If synchronous motor generators are used in combination with absorption type dynamometers in the manner described in my aforesaid co-pending application, the dynamometers are set to absorb the average torque load at the synchronous speed of the motor generators. Any change in torque results in either current consumption or current output by the motor generators, which is measured on suitably calibrated wattmeters.

For making brake and power loss tests the motors are used to drive the rolls and torque or power is measured by reference to their power consumption. As the torques involved in such tests are ordinarily much lower than those developed in power output tests, it is not necessary to adjust the frame angle in most cases. If necessary the angle, which is negative in this case, can be controlled as previously described.

DYNAMOMETER FOR TRACK DRIVEN VEHICLES

Figure 5:
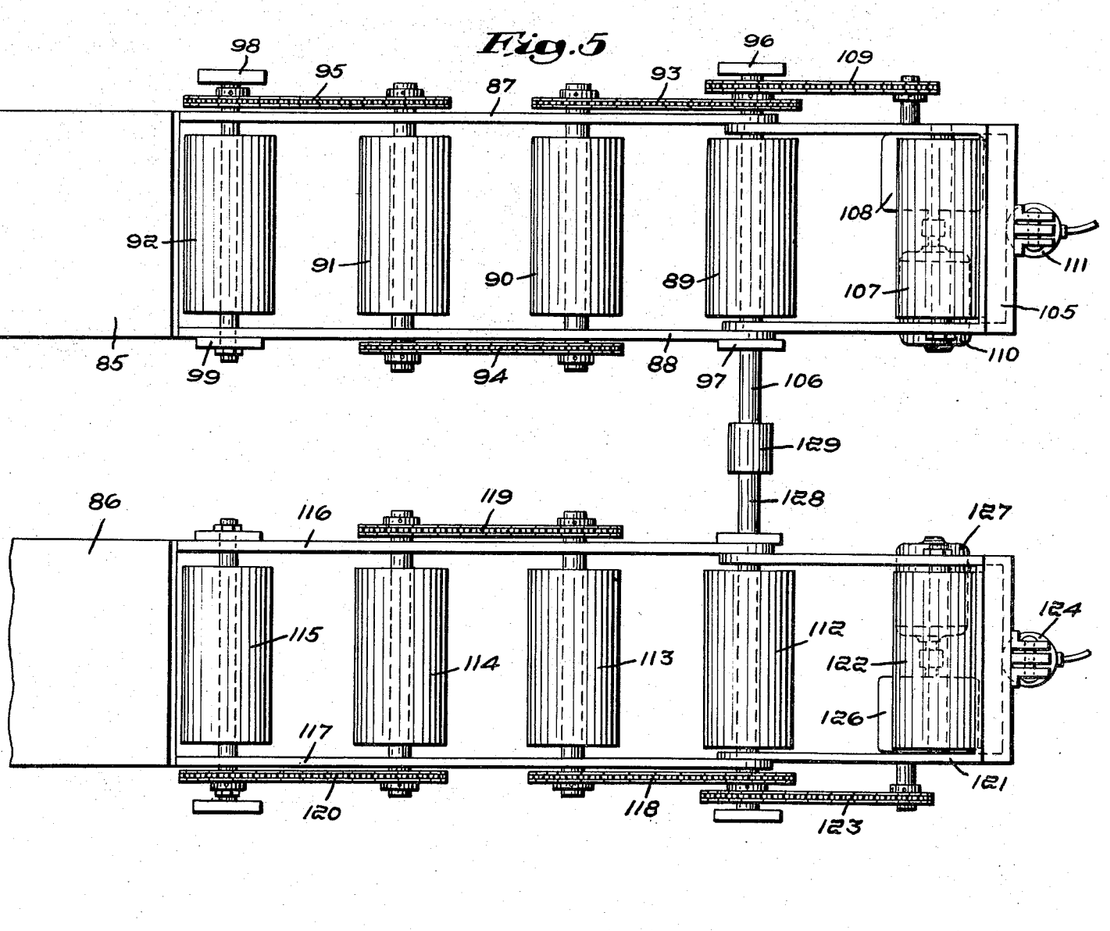
FIG. 5 is a plan view of a modified form of dynamometer intended for testing track driven as well as wheel driven vehicles.
Figure 6:
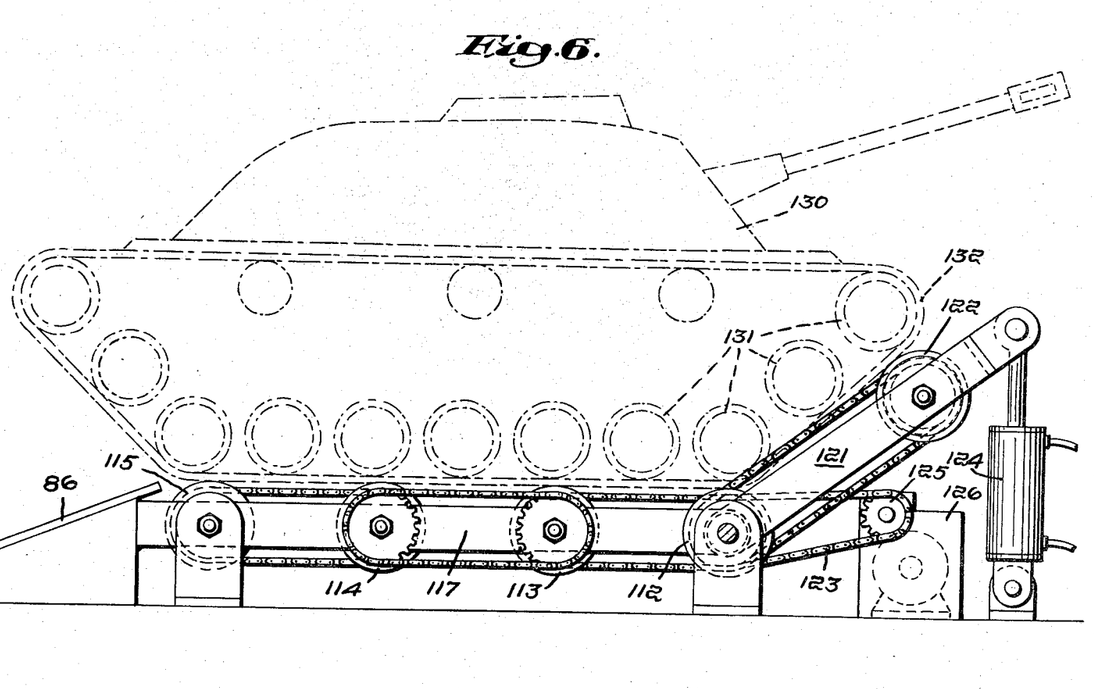
FIG. 6 is a side elevation of the dynamometer of FIG. 5.

The dynamometer shown in FIGS. 5 and 6 is intended primarily for testing track driven vehicles. The device is shown as floor mounted and equipped with approach ramps 85 and 86, but it is understood that the device may be mounted in a pit with the supporting rolls at floor level.

The support for the left hand track consists of a spaced pair of frames 87 and 88 of any suitable construction to support the expected weight. A series of rolls 89, 90, 91 and 92 are rotatably mounted transversely between the frames and are connected together by one to one ratio chain and sprocket drives 93, 94 and 95.

A U-shaped frame 105 is journalled on suitable bearings (not shown) on frames 87 and 88, respectively, concentric with the shaft 106 or roll 89. A roll 107 is mounted in frame 105 with its axis parallel to the other rolls. A dynamometer 108 is connected by a chain and sprocket drive 109 to roll 107, and a motor or motor generator 110 is connected through the dynamometer to roll 107.

The angle of frame 105 is controlled by a hydraulic cylinder 111. The operation of the cylinder is controlled by a suitable valve operated manually or otherwise.

The support assembly for the right hand track of the vehicle is similar to that of the left track. A series of rolls 112, 113, 114 and 115 are mounted between a pair of stationary frames 116 and 117, and connected together by a chain and sprocket drives 118, 119 and 120. A U-shaped frame 121 is mounted to swing on frame 18 about the axis of roll 112 and carries a roll 122 which is connected by chain and sprocket drive 123 to roll 112. The position of frame 121 is controlled by a hydraulic cylinder 124. Roll 112 is connected by drive 125 to a dynamometer 126 and a motor or motor-generator 127. The shaft 128 of roll 112 is connected to shaft 106 through a clutch 129.

*Operation of dynamometer for track driven vehicles*

To test a vehicle such as a tank or tractor, the vehicle is driven onto the test apparatus. Frames 105 and 121 are raised by means of their associated pistons to bring rolls 65 into engagement with the forward portion of the track run which is usually disposed at an oblique angle.

The power output of either or both tracks when driven by the vehicle's engine can be measured by the dynamometers or combinations of dynamometer and motor generator, as previously described. The rolls 107 and 122 bearing against the forward portion of the track, prevent forward motion of the vehicle and maintain it in such a position that the load is divided among the rolls under the horizontal drive portions of the tracks.

The chain and sprocke drives 109 and 123 may be made of such a ratio that rolls 107 and 122 are driven slightly faster than the other rolls, so as to produce a downward force on the vehicle, both to improve traction and to prevent the vehicle from climbing on rolls 107 and 122. Some slippage will then occur at these rolls, but this does not give rise to a serious wear problem in the case of a track driven vehicle. The distribution of the vehicle load over several points minimizes wear on the tracks. Motors 110 and 123 may be used to drive the sets of rolls for testing braking and power losses.

In FIG. 6, a tank 130 is illustrated in dotted outline in position on the chassis dynamometer. Such vehicles have drive wheels 131 which drive the track 132. By adjusting the position of rolls 107 and 122 the longitudinal position of the vehicle may be varied so that the drive wheels 131 may be made to overlie the test rolls, or the rolls may engage the track between two drive wheels. In the latter case, the track tends to bend around the test rolls and provide a larger bearing area.

This type of chassis dynamometer can also be used to test wheel driven vehicles. In this case the drive wheels are placed so as to be cradled between the pairs of rolls 89, 107 and 112, 122. It is understood that a suitable platform is provided to support the front wheels of the vehicle, unless the apparatus is pit mounted with the test rolls at floor level. The sprockets of drives 109 and 123 are changed to provide a one to one drive ratio, and drives 93 and 118 are preferably disconnected. The angle of frames 105 and 121 may be controlled manually or automatically in any of the ways previously described and the apparatus operates in essentially the same way as the chassis dynamometer designed for wheel driven vehicles only.

As the cost of a chassis dynamometer and the associated instrumentation is quite high, especially in the high power range, the fact that the same equipment can be used for either track driven or wheel driven vehicles is an important advantage.

The chassis dynamometers here described make it practical to test vehicles in power ranges much higher than the ranges used in previous types of chassis dynamometers. For example, in the type using two pairs of rolls, the torque which can be transmitted between the rolls and the drive wheels, without exceeding the permissible tire load or causing slippage is approximately doubled. In the type designed for track driven vehicles the torque which can be transmitted is approximately the permissible track load at any one point, multiplied by the number of rolls in a set. It is thus possible to test accurately the performance of many large, high powered vehicles, which could not previously be tested in fully assembled condition up to their maximum power output. The effect of adjustments made while the vehicle is running different fuels, and other factors affecting performance can also be easily determined.

Although the ability to transmit large torques without overloading the tires is an important feature of the device, when used as a chassis dynamometer, the apparatus can also, with a slight modification, be used for tire testing. By changing the ratio of drives 21 and 38 of the first type of dynamometer to other than a one to one ratio, a known differential between the speeds of the rolls 10, 11 and 12, 13 is produced, this deliberately introducing slippage between the tires and the rolls. Fatigue tests, tests for defects in tires, and comparisons of one tire with another, can be made by driving a loaded tire on either or both sets of rolls. The forward pairs of rolls 89, 107 and 112, 126 of the dynamometer for track driven vehicles can also be used for the same purpose by using drives 109 and 123 of other than one to one speed ratio. The angular adjustment of the frames is useful in preventing the tire from climbing onto one roll with which it maintains traction and lose slipping contact with the other roll.

It is understood that many variations may be made to adapt equipment of this type for particular uses. For example, in the case of four wheel drive vehicles, the output of all four wheels can be measured simultaneously by adding a duplicate of the apparatus shown in FIG. 1 for the front wheels. Twin axle vehicles may be accommodated by adding a third roll on each of the movable frames. Many alternative mechanisms for tilting the frames may also be used. The particular arrangement described herein is intended as illustration only and the invention includes any modifications and variations within the scope of the appended claims.

What is claimed is:

1. A testing device, for vehicles having ground engaging drive members, comprising a tiltably mounted frame having its longitudinal axis movable between a horizontal position and an oblique position, a pair of rolls having their longitudinal axes rotatably mounted transversely on said frame and adapted to engage one of said drive members in driving relationship therewith, means for tilting said frame to any selected angle, torque imposing means connected to said rolls and means for measuring driving power transmitted between both said rolls and a drive member engaged therewith.

2. A testing device, for vehicles having ground engaging drive members, comprising a tiltably mounted frame having its longitudinal axis movable between a horizontal position and an oblique position, a pair of rolls having their longitudinal axes rotatably mounted transversely on said frame and adapted to engage one of said drive members in driving relationship therewith, means for selectively fixing said frame at any one of several angles, torque imposing means connected to said rolls and means for measuring driving power transmitted between both said rolls and a drive member engaged therewith.

3. A testing device, for vehicles having ground engaging drive members, comprising a tiltably mounted frame having its longitudinal axis movable between a horizontal position and an oblique position, a pair of rolls having their longitudinal axes rotatably mounted transversely on said frame and adapted to engage one of said drive members in driving relationship therewith, load detecting means responsive to the load imposed on one of said rolls by a drive member engaged therewith, means operated by said load detecting means for tilting said frame so as to maintain constant load on the roll associated with said detecting means, and means for measuring driving power transmitted between said rolls and a drive member engaged therewith.

4. A testing device, for vehicles having ground engaging drive members, comprising a tiltably mounted frame having its longitudinal axis movable between a horizontal position and an oblique position, a pair of rolls having their longitudinal axes rotatably mounted transversely on said frame and adapted to engage one of said drive members in driving relationship therewith, torque measuring means responsive to driving torque transmitted between said rolls and a drive member engaged therewith, and control means operated by said torque measuring means and adapted to tilt said frame to an angle which is a predetermined function of the measured torque.

5. A testing device as described in claim 4, said control means being adapted to maintain said frame at an angle at which the loads imposed on the rolls by a drive member engaged therewith are substantially equal.

6. A testing device for wheeled vehicles comprising first and second tiltable frames mounted side by side, said frames having their longitudinal axes movable between a horizontal position and an oblique position, a first pair of rotatable rolls having their longitudinal axes mounted transversely on said first frame, a second pair of rotatable rolls having their longitudinal axes mounted transversely on said second frame, each of said pairs of rolls being adapted to support and drivingly engage one of a pair of drive wheels of a vehicle, means for tilting said frames between a horizontal position and an oblique position, torque imposing means connected to both rolls of each pair and means for measuring driving power transmitted between the rolls of each pair and a wheel engaged therewith.

7. A testing device, for vehicles of the type having a drive track with a horizontal run portion and an upwardly extending run portion, comprising a plurality of rotatably mounted rolls disposed at the same level and adapted to drivingly engage the horizontal run portion of a vehicle track, an end roll adapted to engage the upwardly extending run portion of a vehicle track, said end roll being disposed at a level higher than that of the other rolls, torque imposing means connected to all said rolls and means for measuring driving power transmitted between all of said rolls and a track engaged therewith.

8. A testing device as described in claim 7, having drive means interconnecting the rolls disposed at the same level in a one to one speed ratio.

9. A testing device as described in claim 7, having means for raising and lowering said end roll.

10. A testing device as described in claim 7, having a first drive means interconnecting the rolls disposed at the same level in a one to one speed ratio, and a second drive means interconnecting said end roll and one of the other rolls and adapted to drive said end roll faster than the other rolls.

11. A testing device, for vehicles of the type having a drive track with a horizontal run portion and an upwardly extending run portion, comprising a plurality of rotatably mounted rolls disposed at the same level and adapted to drivingly engage the horizontal run portion of a vehicle track, an end roll adapted to engage the upwardly extending run portion of a vehicle track, said end roll being disposed at a level higher than that of the other rolls, drive means interconnecting all said rolls to drive them in unison, and means for measuring driving power transmitted between all said rolls and said track.

12. A testing device, for vehicles having ground engaging drive members, comprising a pair of rotatably mounted rolls adapted to engage one of said members in torque transmitting relationship, one of said rolls being disposed at a higher level than the other, torque imposing means connected to both said rolls, means for raising and lowering one of said rolls with respect to the other, and means for measuring torque transmitted between both said rolls and a drive member engaged therewith.

13. A dynamometer testing system for determining the power output of vehicles having ground engaging drive members, comprising first and second rolls, means for rotatably supporting said first roll, means for rotatably supporting said second roll at an elevation above said first roll position, said first and second rolls positioned to engage one of the drive members in torque-transmitting relationship and be driven thereby, and torque-absorbing means coupled to each of the rolls.

14. A dynamometer testing system in accordance with claim 13, in which the first and second rolls are coupled together for rotation and in which the second roll is in front of said first roll.

15. A dynamometer testing system for determining the power output of vehicles having ground engaging drive members, comprising first and second rolls, means for rotatably supporting said first roll, means for rotatably supporting said second roll at an elevation above said first roll position, said first and second rolls positioned to engage one of the drive members in torque-transmitting relationship and be driven thereby, torque-absorbing means coupled to each of the rolls, and measuring means responsive to said torque-absorbing means to determine the power output transmitted by the drive member to each roll.

References Cited

UNITED STATES PATENTS

| | | | |
|---|---|---|---|
| 1,938,349 | 12/1933 | Norton | 73—136 |
| 2,372,704 | 4/1945 | Bennett | 73—134 |
| 2,709,362 | 5/1955 | Marcus et al. | 73—117 X |

FOREIGN PATENTS

| | | |
|---|---|---|
| 1,238,012 | 6/1960 | France. |
| 1,262,208 | 4/1961 | France. |

RICHARD C. QUEISSER, *Primary Examiner.*

J. W. MYRACLE, *Assistant Examiner.*